(12) United States Patent
Dahlen

(10) Patent No.: US 9,145,067 B1
(45) Date of Patent: Sep. 29, 2015

(54) SYSTEM AND METHOD OF MONITORING AND CONTROLLING MOTORIZED PASSENGER CARTS

(71) Applicant: Shane J Dahlen, Tempe, AZ (US)

(72) Inventor: Shane J Dahlen, Tempe, AZ (US)

(*) Notice: Subject to any disclaimer, the term of this patent is extended or adjusted under 35 U.S.C. 154(b) by 0 days.

(21) Appl. No.: 14/297,402

(22) Filed: Jun. 5, 2014

(51) Int. Cl.
| | |
|---|---|
| B60L 15/10 | (2006.01) |
| B60L 15/20 | (2006.01) |
| G01C 21/36 | (2006.01) |
| G01S 1/00 | (2006.01) |
| G08B 21/02 | (2006.01) |
| B60K 31/00 | (2006.01) |

(52) U.S. Cl.
CPC .......... B60L 15/10 (2013.01); B60L 15/2009 (2013.01); G01C 21/3697 (2013.01); G01S 1/00 (2013.01); G08B 21/0205 (2013.01); B60K 2031/0091 (2013.01)

(58) Field of Classification Search
USPC .......................................................... 701/22
See application file for complete search history.

(56) References Cited

U.S. PATENT DOCUMENTS

| | | | | |
|---|---|---|---|---|
| 6,491,122 | B2* | 12/2002 | Leitner et al. | 180/65.8 |
| 7,438,148 | B1* | 10/2008 | Crea | 180/167 |
| 7,591,335 | B2* | 9/2009 | Howell et al. | 180/197 |
| 7,865,275 | B2* | 1/2011 | Palmer et al. | 701/22 |
| 8,172,033 | B2* | 5/2012 | Corbett et al. | 180/402 |
| 8,239,251 | B2* | 8/2012 | Wellman | 705/7.29 |
| 8,366,135 | B2* | 2/2013 | Asbach et al. | 280/446.1 |
| 2003/0236601 | A1* | 12/2003 | McLeod et al. | 701/29 |
| 2005/0090981 | A1* | 4/2005 | Gaegauf et al. | 701/301 |
| 2005/0171663 | A1* | 8/2005 | Mittelsteadt et al. | 701/35 |
| 2007/0208483 | A1* | 9/2007 | Rabin | 701/72 |
| 2008/0015745 | A1* | 1/2008 | Gaegauf et al. | 701/19 |
| 2008/0103696 | A1* | 5/2008 | Cheok et al. | 701/300 |

* cited by examiner

Primary Examiner — Thomas Tarcza
Assistant Examiner — Alex C Dunn
(74) Attorney, Agent, or Firm — David W. Carstens; Austin C. Teng; Carstens & Cahoon, LLP

(57) ABSTRACT

In accordance with one embodiment, a system is provided for safely conveying passengers indoors using a steerable motorized passenger cart, the maximum speed of which is limited based on its location within the interior space. In particular embodiments, the present invention further includes an interchangeable vehicle skin affixed to the motorized passenger cart.

14 Claims, 15 Drawing Sheets

SYSTEM AND METHOD OF MONITORING AND CONTROLLING MOTORIZED PASSENGER CARTS

CROSS-REFERENCE TO RELATED APPLICATIONS

This application does not claim benefit to any provisional application.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates in general to the field of electronic transportation systems, and more specifically, to a system of monitoring and controlling motorized passenger carts.

2. Description of Related Art Including Information Disclosed Under 37 CFR 1.97 and 1.98

Large amusement and retail spaces offer a diversity of options to customers, but often feature large distances. There is a strong correlation between the amount of retail sales and the level of foot traffic that these spaces can drive. The longer a patron stays and shops, the more money a proprietor can make. However, patrons with young children are often limited by the amount of time they can spend shopping because their children become bored or get tired of walking around.

Limitations of strollers, shopping carts, and bikes. Moving sidewalks can help shorten long spans, but do enable a patron to move around freely. Segways, golf carts, and personalized tram services may be too large to operate in multi-level environments like a shopping mall. Moreover, mixing vehicles with pedestrians can create an unsafe environment that may be disruptive.

BRIEF SUMMARY OF THE INVENTION

In accordance with one aspect of the present invention, a system and method of safely transporting individuals within an enclosed area is provided which substantially eliminates or reduces disadvantages associated with previous systems or methods.

In accordance with one embodiment, a system is provided for safely conveying passengers indoors using a steerable motorized passenger cart, the maximum speed of which is limited based on its location within the interior space. In particular embodiments, the present invention further includes an interchangeable vehicle skin affixed to the motorized passenger cart. In other embodiments, the cart's location may be used to deliver targeted advertising or to augment customer experiences by delivering supplemental media to the rider based on his location.

In accordance with another embodiment, a method is provided for remotely towing a motorized passenger cart, comprising the steps: forming a wireless bond between a motorized passenger cart and a tow; determining the speed, bearing, and distance from the tow; and automatically adjusting the speed and the heading of the cart so as to keep the distance within a preconfigured range. In particular embodiments, the tow may be a guardian or another motorized passenger cart.

One advantage of the features described herein is that a disparate and individualized indoor transportation system is made possible by introducing monitoring and safety mechanisms that protect both passengers and other patrons and bystanders. Another advantage is that patronage at large retail or amusement spaces, whether indoors or outdoors, can be improved by maximizing the amount of time patrons can spend at shops or attractions by decreasing travel times. Patronage can be further improved by offering location-based advertising and by providing business intelligence from collected traffic data.

BRIEF DESCRIPTION OF THE DRAWINGS

For a more complete understanding of the present invention and its advantages, reference is now made to the following description taken in conjunction with the accompanying drawings, in which like reference numbers indicate like features, and.

DETAILED DESCRIPTION OF THE INVENTION

In the following detailed description, various embodiments demonstrate features of a motorized cart system that yield some of the above-mentioned advantages.

Figure 1:
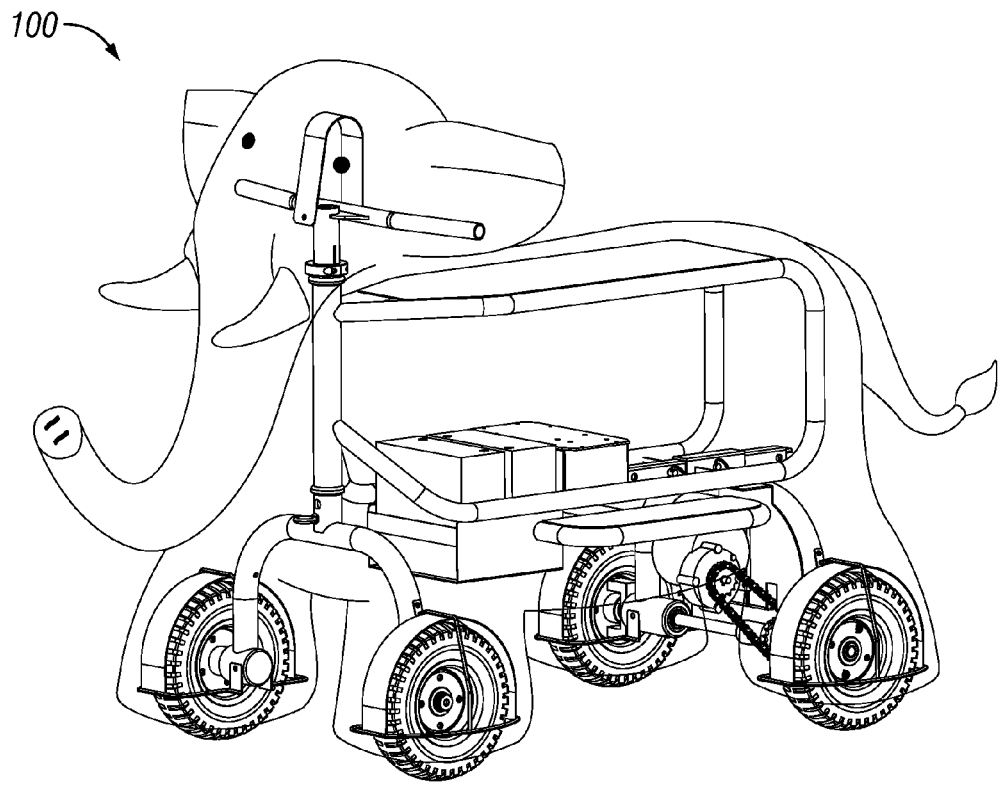
FIG. 1 illustrates a motorized passenger cart configured with an interchangeable ornamental shell in accordance with one embodiment of the present invention.

FIG. 1 depicts an embodiment in which a motorized passenger cart 100 is fitted with an ornamental shell. The ornamental shell may be constructed of durable materials, such as metals, alloys, plastics, resins, rubbers, carbon-fiber, or other suitable materials. That material may be painted, covered, or molded so as to give the appearance of an animal, creature, car, truck, plane, train, spaceship, or some other form that may inspire the imagination of the rider. For instance, in certain embodiments where the ornamental shell mimics the likeness of a creature, it may be desirable for the ornamental shell to consist of a padded textile skin to enhance the realism and comfort to the rider. One advantage of having an interchangeable outer shell is that the shell may be removed for cleaning or repair. A motorized passenger cart 100 is likely to see many different passengers when deployed in a public space. An outer shell that could not be removed occasionally for cleaning would be difficult to keep sanitary between uses. Moreover, a removable outer shell allows a proprietor to change out shell designs based on what is most popular or marketable with its customers.

Figure 2A:
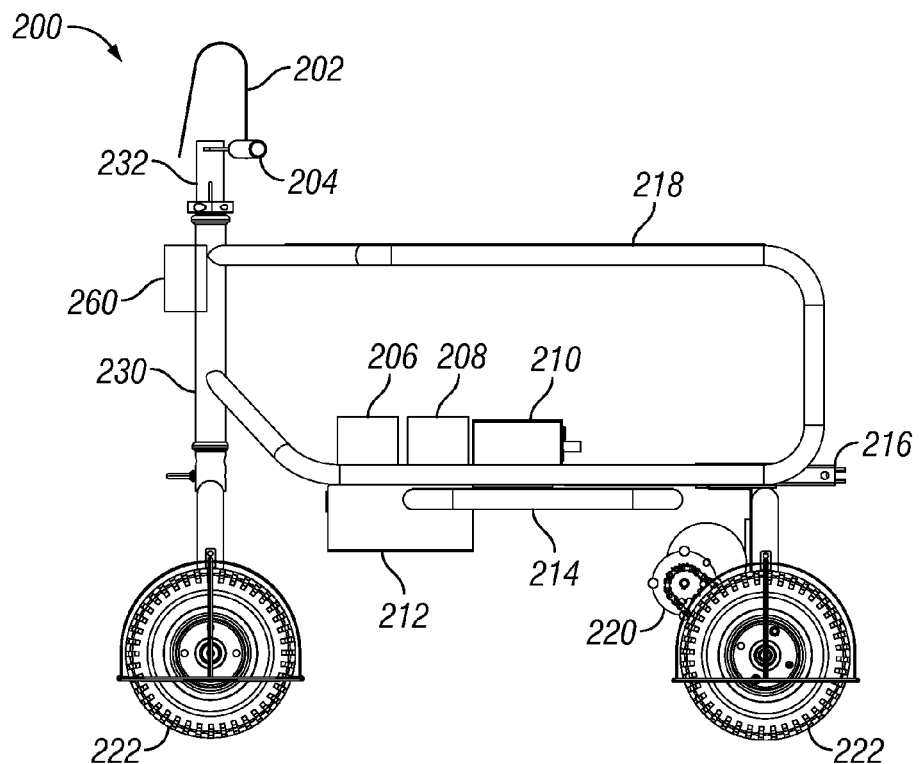
FIG. 2A illustrates a side view of a motorized passenger cart in accordance with one embodiment of the present invention.

FIG. 2A depicts an embodiment 200 featuring a forward sensor array. The motorized passenger cart 200 is comprised of a frame assembly connected to a split axle that is driven by a motor 220. A head support bracket 202 may be affixed to the frame neck 230 or the steering column 232. The head support bracket 202 supports the weight of the outer shell. A head support bracket 202 may take the form of other shapes and sizes depending on the structural needs of the outer shell. For example, an outer shell shaped like a fire truck may require two angular brackets. Alternatively, fabric skins or animal shapes can be attached by Velcro or snapped to the frame. The handle bars 204 are affixed to the steering column 232, allowing the rider to pivot the front wheels 222 to steer the motorized passenger cart 200. The frame seat 218 supports the rider's weight in conjunction with the foot plate 214. In the depicted embodiment, the frame seat 218 is suspended above a cavity containing the control unit 206, which is communicatively coupled to the forward sensor array 260, the transceiver 210, and powered by the battery 212. The battery 212 may be any capacitive device suitable for untethered operation of the vehicle. For example, the battery 212 may be an array of one or more lithium ion, sealed lead acid, or nickel metal hydride cells. The motor 220 also draws power from the battery 212 to drive the rear wheels 222. The depicted embodiment also features a rear-tow assembly 216 that may be connected to a trailer or another motorized passenger cart.

Figure 2B:
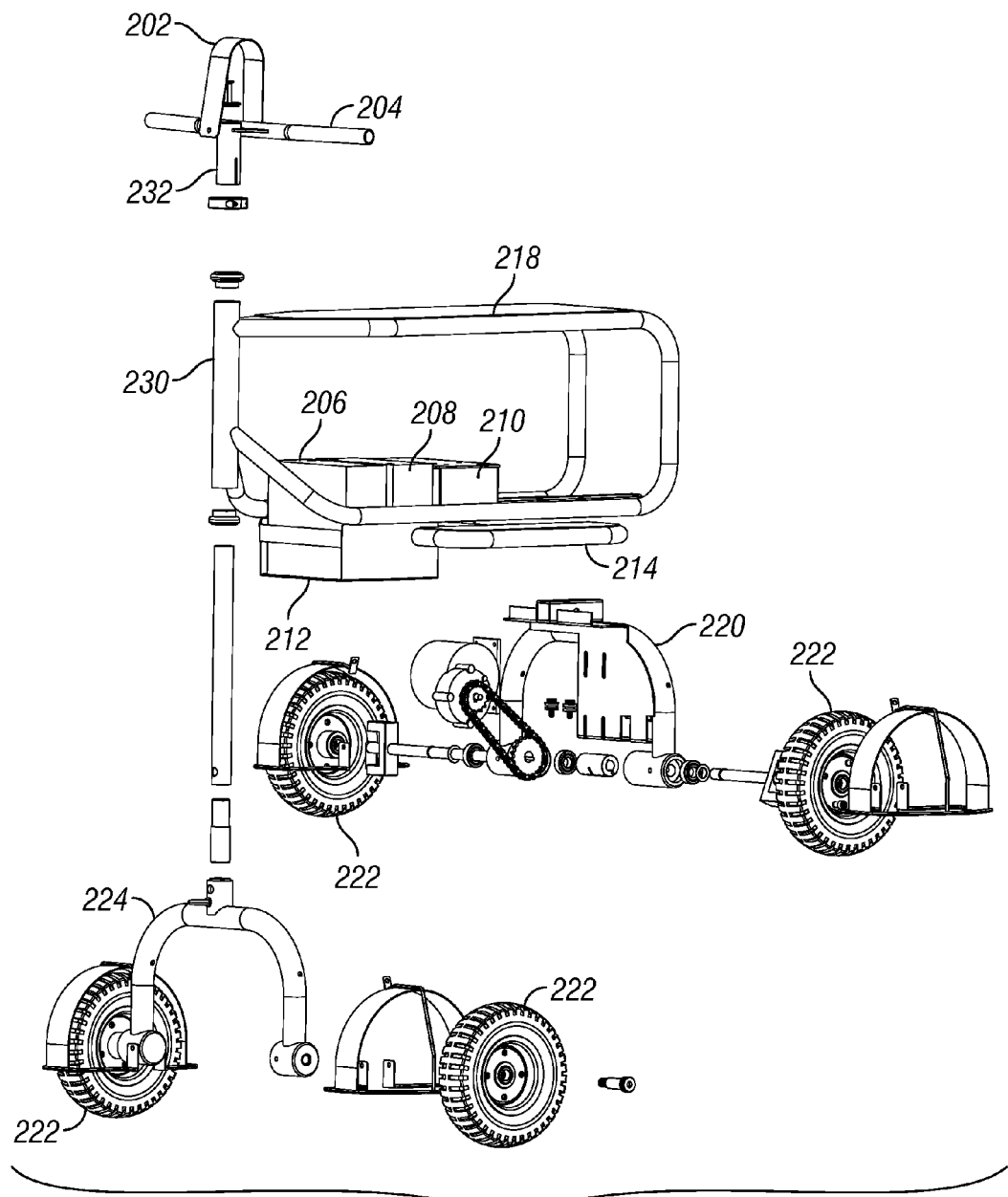
FIG. 2B illustrates an exploded view of a motorized passenger cart in accordance with one embodiment of the present invention.

FIG. 2B depicts an exploded view of a motorized passenger cart.

Figure 2D:
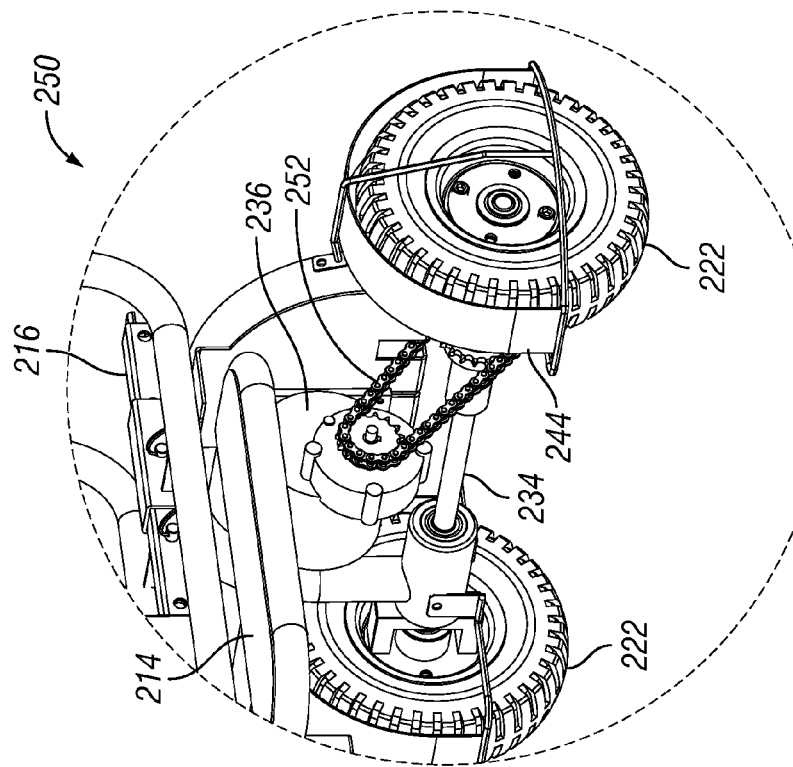
FIG. 2D illustrates an enlarged isometric view of the drive chain of a motorized passenger cart in accordance with one embodiment of the present invention.
Figure 2C:
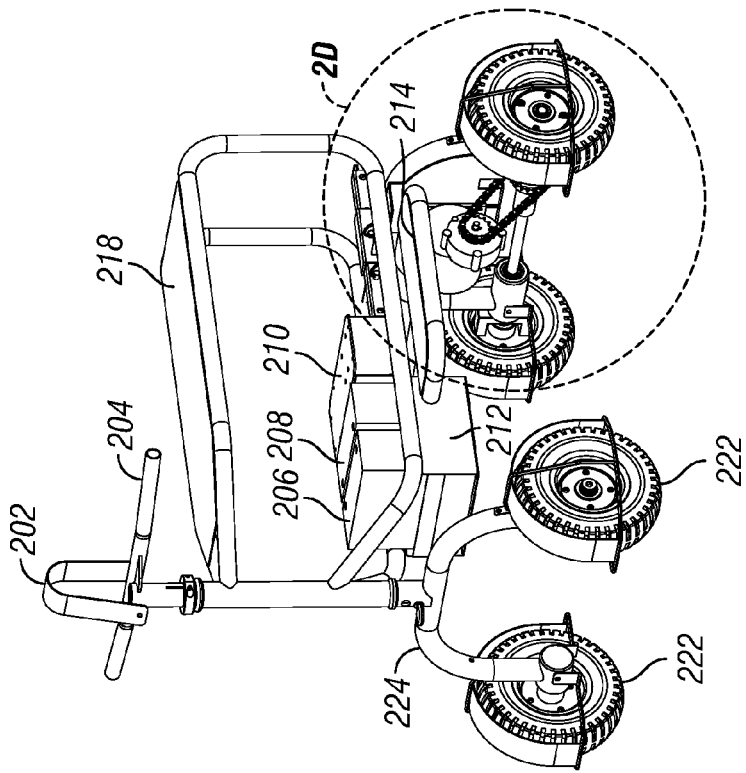
FIG. 2C illustrates an isometric view of a motorized passenger cart in accordance with one embodiment of the present invention.

FIG. 2C depicts an isometric view of a motorized passenger cart.

FIG. 2D depicts an enlarged, isometric view 250 of a motorized passenger cart. The main propulsion motor 236 is capable of propelling the motorized passenger cart with constant velocity regardless of the number or size of the riders or the type of terrain traversed. To do so, the cart's control system may adjust the RPM of the motor up or down to accommodate different levels of strain on the main motor 236. It should be understood that constant velocity refers to a preconfigured speed maximum (for a given operating area) and a corresponding acceleration profile. For example, a cart whose rider weighs 50 lbs. should accelerate and achieve the same maximum speed as a cart whose rider weighs 150 lbs. assuming the carts are operating within the same speed zone. The motor 236 delivers power to the rear wheels via a drive chain 252 that rotates a common axle 234. A finger and toe guard 244 protects the wheels from being interfered with while the wheels 222 are in motion. In addition speed and acceleration control, the main propulsion motor 236 may also be used to accomplish near instantaneous braking. The main propulsion motor 236 may allow for reverse polarity braking when the cart's rider releases the throttle. The direction of the motor is reversed and the cart is actively slowed by transmitting power to the wheels 222 in the opposite direction of travel.

Figure 2E:
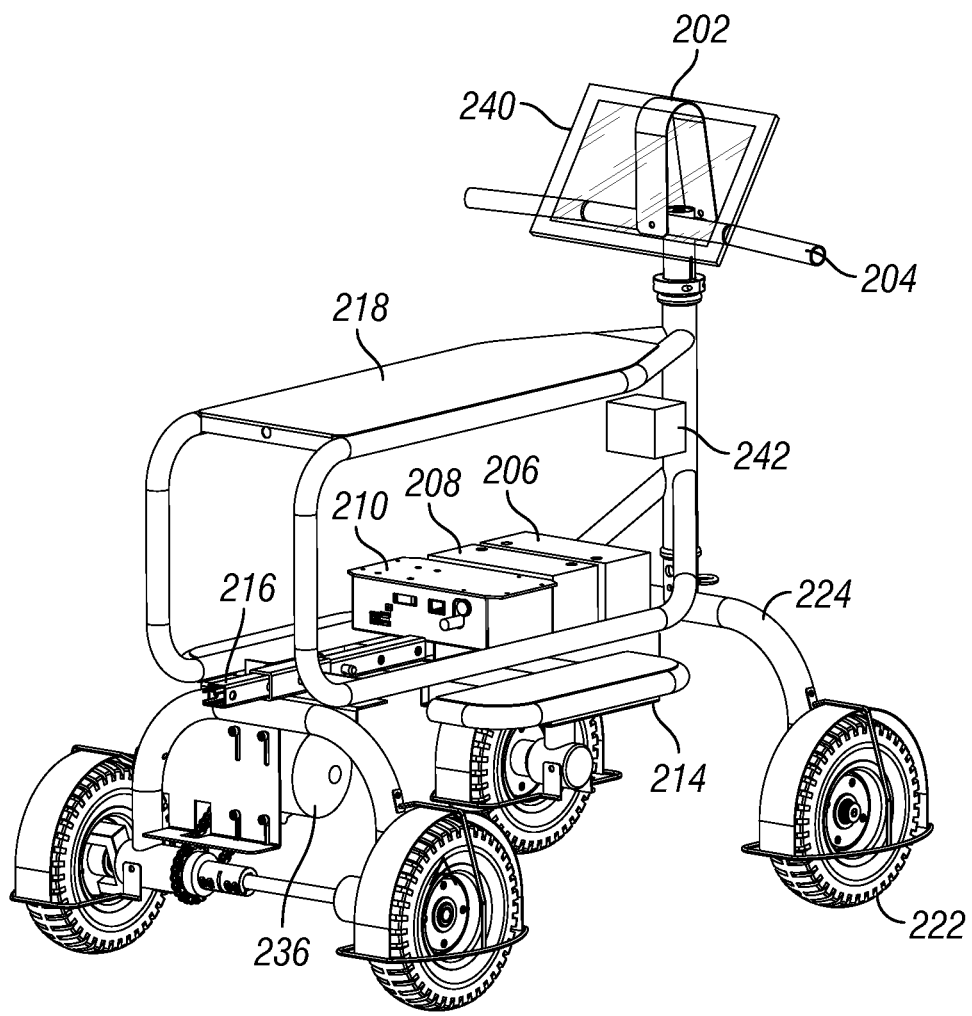
FIG. 2E illustrates a rear view of a motorized passenger cart with an electronic display in accordance with one embodiment of the present invention.

FIG. 2E depicts a rear view of a motorized passenger cart consistent with another embodiment. In such an embodiment, an electronic display 240 is mounted over the handlebars 204. The electronic display 240 may be any electronic device suitable for displaying an image to a user, such as an LCD, LED, OLED, electronic ink display, or other similar device. The electronic display 240 may also comprise a capacitive layer, which enables the device to function as a "touchscreen." Additionally, the electronic display 240 may be driven by logic contained within the device itself (such as with a tablet or smart device), or it may rely on external logic contained within the control unit 206.

The electronic display 240 may be located elsewhere on the motorized passenger cart without departing from the essence of the invention. For example, in other embodiments, the display 240 may be affixed above the frame seat 218. The electronic display 240 is accessible to a rider via a transparent layer or an opening in the ornamental shell (not depicted).

Figure 3:
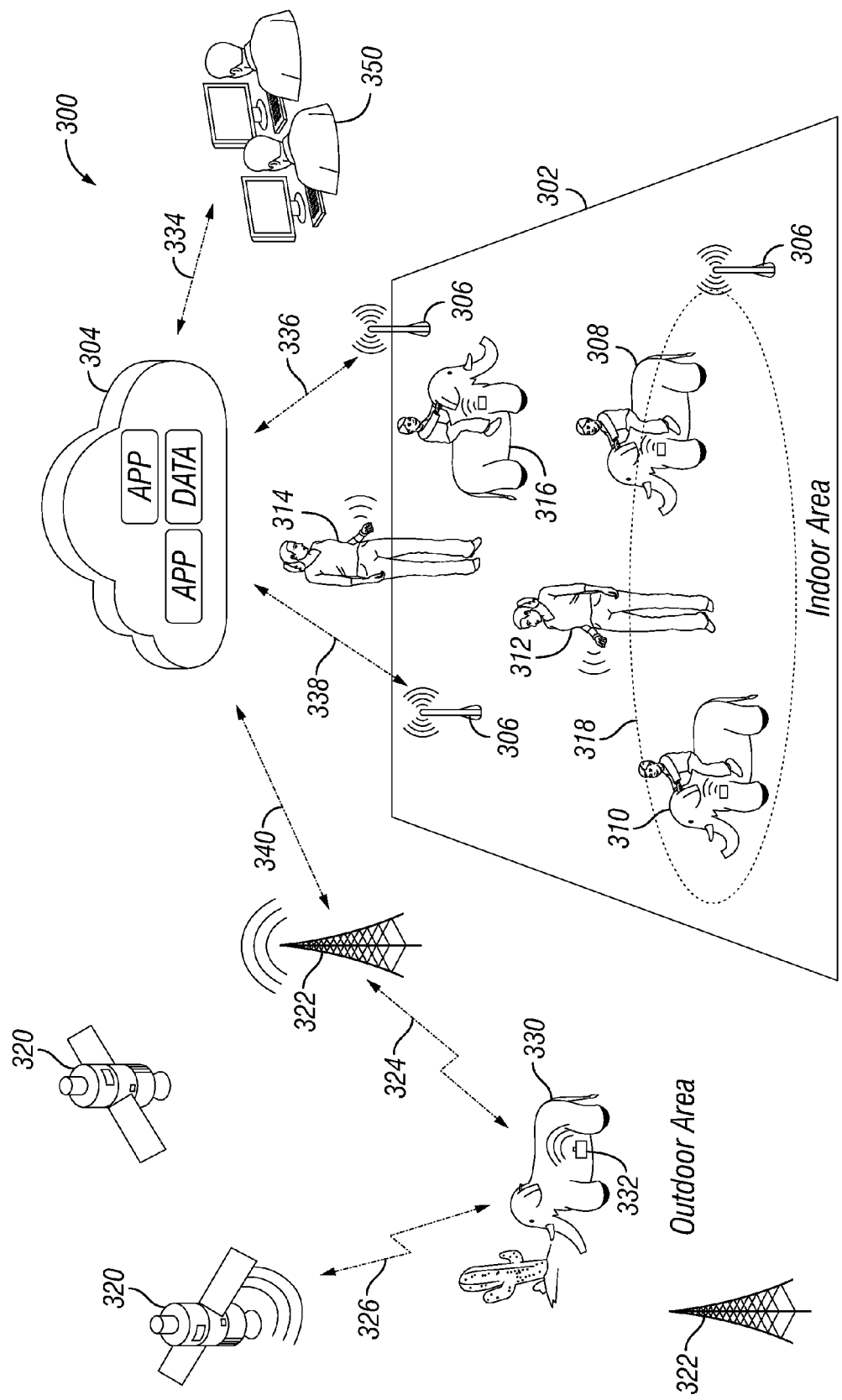
FIG. 3 illustrates a plurality of motorized carts in communication with a control and monitoring system.

FIG. 3 depicts a system-wide view of a plurality of motorized passenger carts in communication with a monitoring and control system 300. The logic 304 for the monitoring and control system 300 can be hosted on- or off-site, but must be communicatively coupled to the indoor positioning system and a cart communication network. The cart communication network may be implemented using WiFi, WiMax, Bluetooth, or any other suitable RF-based networking technology. The indoor positioning system comprises positioning beacons 306 that are stationed at known locations within an indoor operating area 302. The positioning beacons 306 and cart communication network may be collocated or rely on shared nodes such as a WiFi access point. A motorized passenger cart triangulates its position within an operating area by estimating its displacement from various beacons 306. Likewise, the monitoring and control system 300 tracks the location of various carts by monitoring positioning messages communicated between a cart and a beacon 306 and relayed over a network connection (336, 338) to be digested by the system's logic 304.

A cart 316 connects to the communication network wirelessly. A guardian 314 is indirectly connected to the system 300 via ad hoc communication with the cart 316. The ad hoc communication may implemented using Bluetooth, WiFi, or any other power efficient networking technology. The ad hoc communication network is also used to establish a mobile operating area 318 centered around a supervising guardian 312. As will be discussed in more detail below, some embodiments may feature child safety systems that slow associated carts (308, 310) or sound an alarm if the carts (308, 310) leave the mobile operating area 318.

Operators 350 monitor the operation of the various connected carts. If the carts are rented on an hourly basis, the system 300 might display a list of rented carts and how much rental time is remaining. An operator 350 can also communicate with guardians by relaying a message to a cart or sending the message to a guardian's smart device if connected to the communication network. If a cart 330 goes missing or is stolen, a transponder 332 relays the location of the missing cart 330 to an operator 350 via cellular communications 324 with cell network 322 and relayed over a wired or wireless communication backbone 340 to the system's central logic 304. Once the missing cart 330 is outside the operating area, it may determine its location using GPS triangulation 326 with satellites 320, or it may rely on cellphone triangulation by communicating with various towers 322 of a cellular network.

In another embodiment, the indoor positioning system can be used to serve fine-grained location based advertising to a motorized passenger cart or its associated guardian via her smart device. For example, if the motorized passenger cart is within a preconfigured proximity of an ice cream parlor, the system's logic 304 can determine whether the proprietor has paid for any advertising, and if so, the system 300 transmits the advertisement (which may be comprised of text, images, video, audio, or some combination) to the cart or associated guardian. The advertising may be triggered when a cart enters a geofenced area, or it may be triggered based on the time of day or some other factor that may drive traffic to the advertiser's store.

In yet another embodiment, the logic 304 of the monitoring and control system 300 in communication with the indoor positioning system and various carts, can enable location based gaming or location rich services. For example, a zoo employing some of the features of the present invention might offer a guided tour of its various exhibits by communicating with the cart's rider via an interactive display in the cart and with the associated guardian's smart device. As the rider approaches a particular exhibit, the cart can provide the rider with additional information and interactive content to augment the guest's experience at the zoo. The system 300 might also provide navigation information via the cart's display to assist guests in finding certain exhibits within the zoo. Furthermore, a zoo, or other retail establishment, might encourage traffic throughout the zoo by offering virtual points for visiting a certain number of exhibits. This might be packaged as a collect-the-animals game. An animal is collected so-to-speak when the cart's rider penetrates a geofenced exhibit area. The game's points may translate to discounts at the zoo's gift shop or tied to virtual merit badges that promote subsequent return trips to the zoo or other retail establishment.

In still another embodiment, the system may store cart positioning and timestamp data in order to enable subsequent analysis of cart traffic patterns and guardian behavior. Such data may be valuable to retail establishments or amusement parks to help optimize traffic flow or to help determine efficacy of advertising and store location. For example, the length of time someone spends at an exhibit or within a shop might be determined by identifying when a cart is stationary for several minutes outside of a shop or identifying a cart whose rider and guardian left the cart together (determined via relative proximity to smart bands) without triggering an alarm condition.

Figure 4:
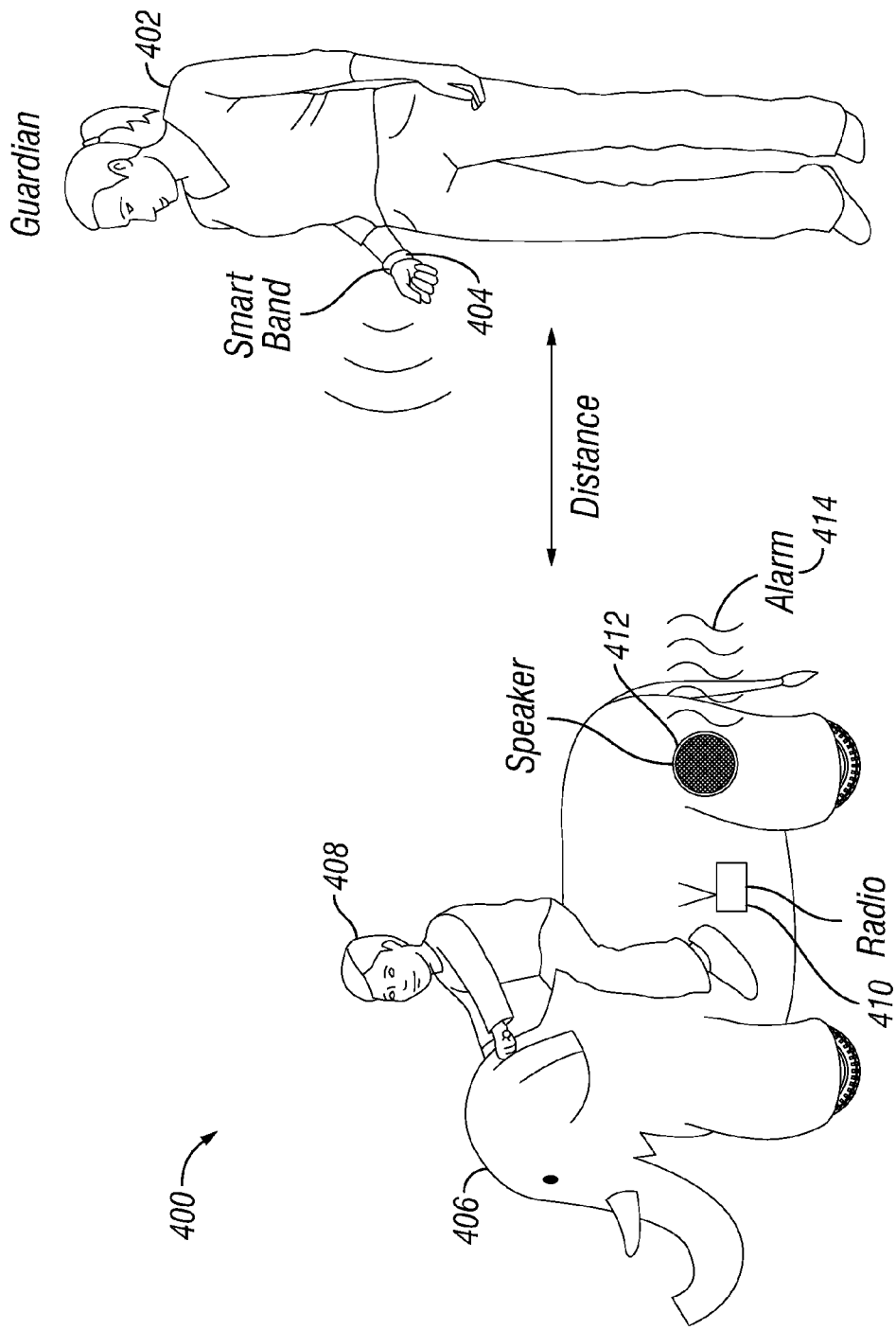
FIG. 4 illustrates a motorized passenger cart bonded with a parent (or guardian) via a smart band in accordance with one embodiment of the present invention.

FIG. 4 depicts a child-safety mechanism 400 in accordance with another embodiment whereby a motorized passenger cart 406 is associated with a guardian 402. The guardian 402 is fitted with a smart band 404 that communicates wirelessly with the motorized passenger cart 406 via a radio 410. If the cart 406 exceeds a preconfigured distance from the smart band 404, an alarm may be triggered. Alternatively, the cart's rider may be warned to slow down or to wait for her guardian to catch up via a recording played over the speaker 412. Or, the cart 406 may automatically decrease its maximum speed inversely proportional to the cart's displacement from the guardian 402. In other words, the farther the cart 406 gets from an associated guardian 402, the slower the cart 406 is able to travel. Thus, the cart is given a limited effective range of operation that depends on its proximity to the guardian 402. Other restrictions on the cart's maximum operating speed or functionality of its other subsystems may be otherwise modified by the absolute position within the operating area of the cart 406 in addition to its relative proximity to the guardian 402.

Figure 5:
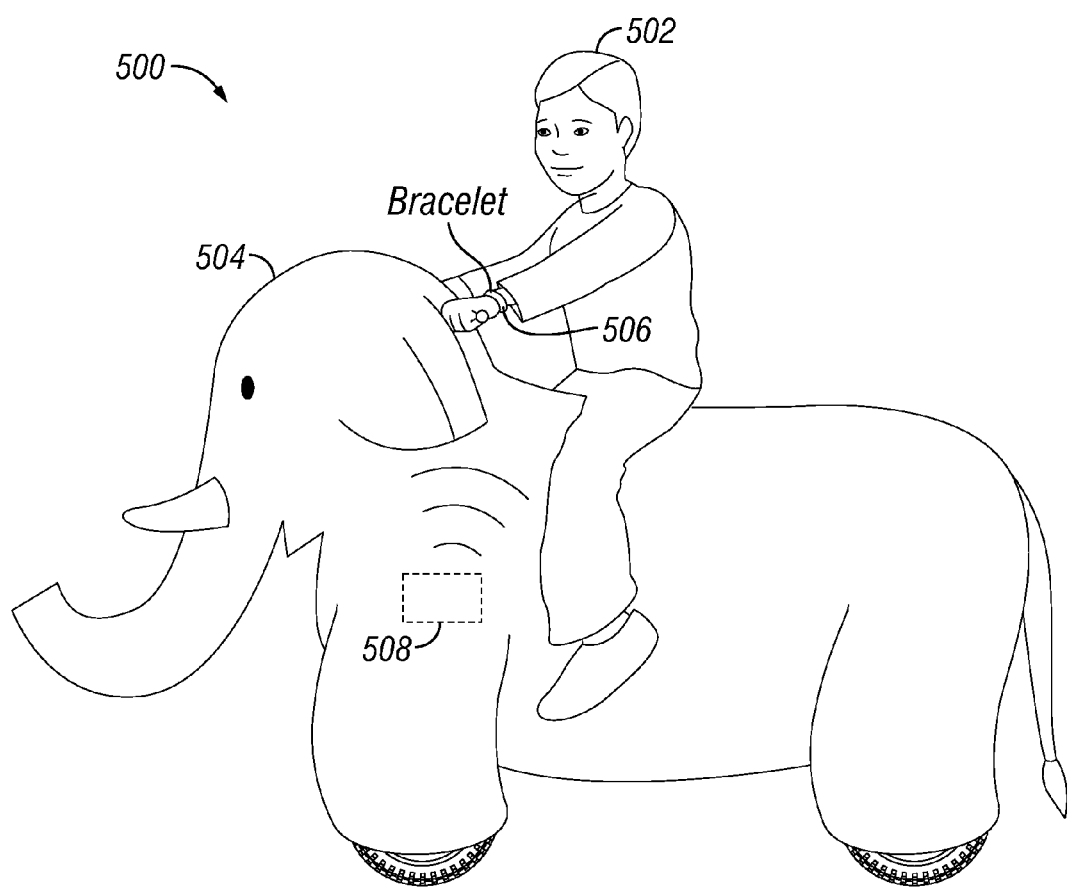
FIG. 5 illustrates a motorized passenger cart bonded with a passenger via a smart band in accordance with one embodiment of the present invention.

FIG. 5 depicts a rider associated with a motorized passenger cart. A rider 502 may be given a smart band 506 that is paired with a cart 504. The smart band 506 may act as an ignition safety mechanism whereby the cart 504 is halted and braked if the rider 502 leaves the immediate vicinity of the cart. The smart band 506 may also be used to prevent one rider from accidentally taking another's cart 504. If the rider 502 wearing a smart band 506 that is associated with a first cart, instead attempts to operate a second cart, the second cart may emit a visual or auditory warning. The warning may be configured differently per cart such that the warning emission matches the theme of the cart's outer shell. For example, a cart 504 may emit roaring sounds if the cart 504 is configured to look like a lion, or honking sounds it the cart 504 has a vehicle theme. Alternatively, if the cart 504 has a visual notification screen 540 embedded in it, the screen 540 may display a friendly message to the rider that the cart 504 belongs to another rider.

Figure 6:
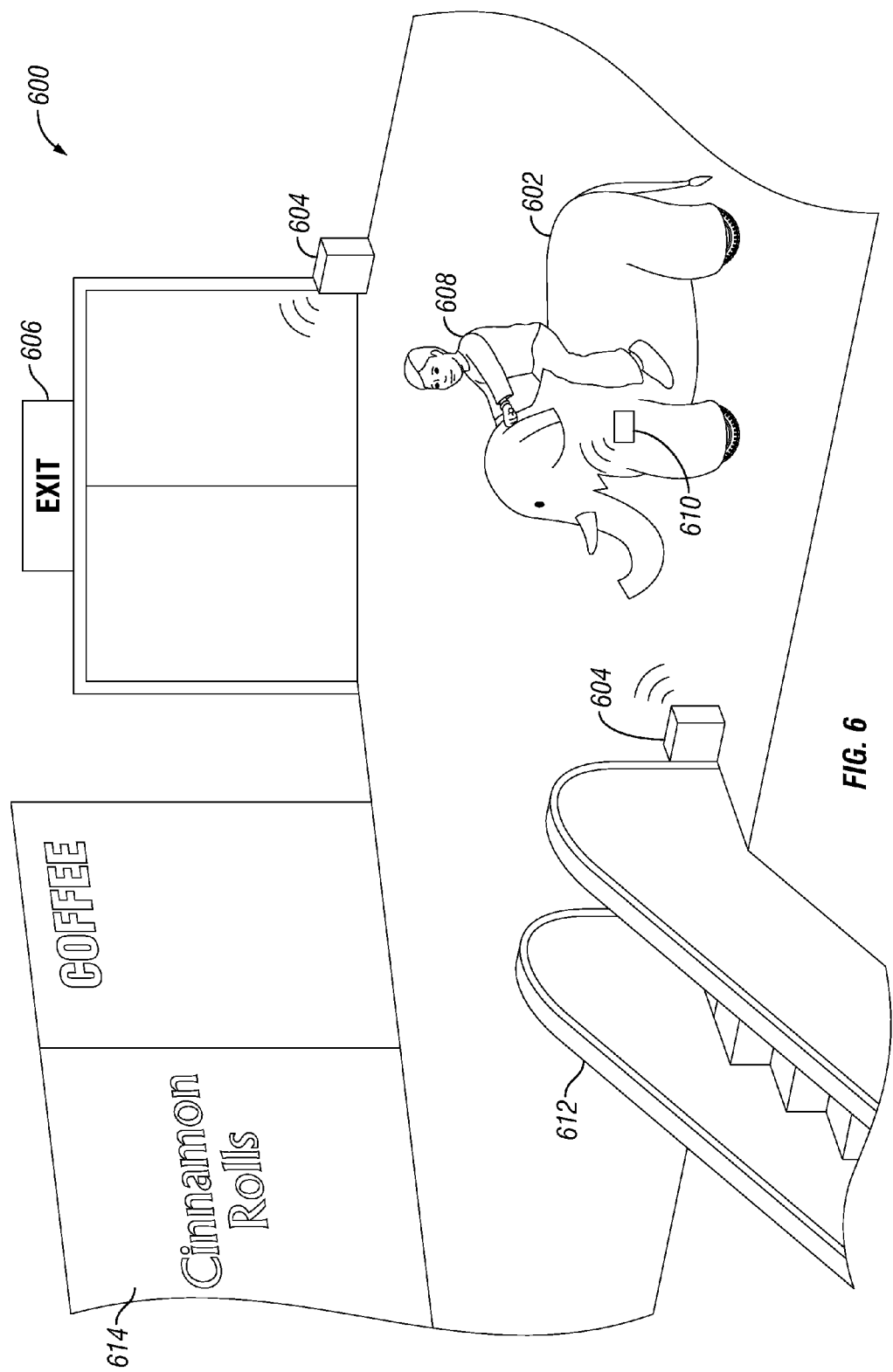
FIG. 6 illustrates a motorized passenger cart in communication with an indoor positioning system in accordance with one embodiment of the present invention.

FIG. 6 depicts a motorized passenger cart 602 in communication with an indoor positioning system 600. Positioning beacons 604 communicate with a motorized passenger cart 602. The cart's simultaneous communications with various beacons 604, which are installed in known physical locations, enable the cart 602 to determine its indoor position. An indoor positioning system 600 enables a monitoring system to modify a cart's behavior depending on its proximity to certain preconfigured zones or areas. For example, a cart 602 that is nearing an escalator 612 or an exit 606 may emit an alarm, slow or halt the cart 602, or display warnings to the rider 608 if the cart 602 is equipped with a visual display. Secondary sensors located on the cart 602 may augment the accuracy of the indoor positioning system 600. For example, an acoustic proximity sensor might be used to take secondary measurements to reduce the uncertainty from determining position based on triangulation alone. Additionally, a camera, coupled with onboard image processing, could be used to identify known landmarks within an indoor or outdoor area (perhaps from signage 614) and to distinguish object noise (such as people and other transient objects) from geography.

Figure 7:
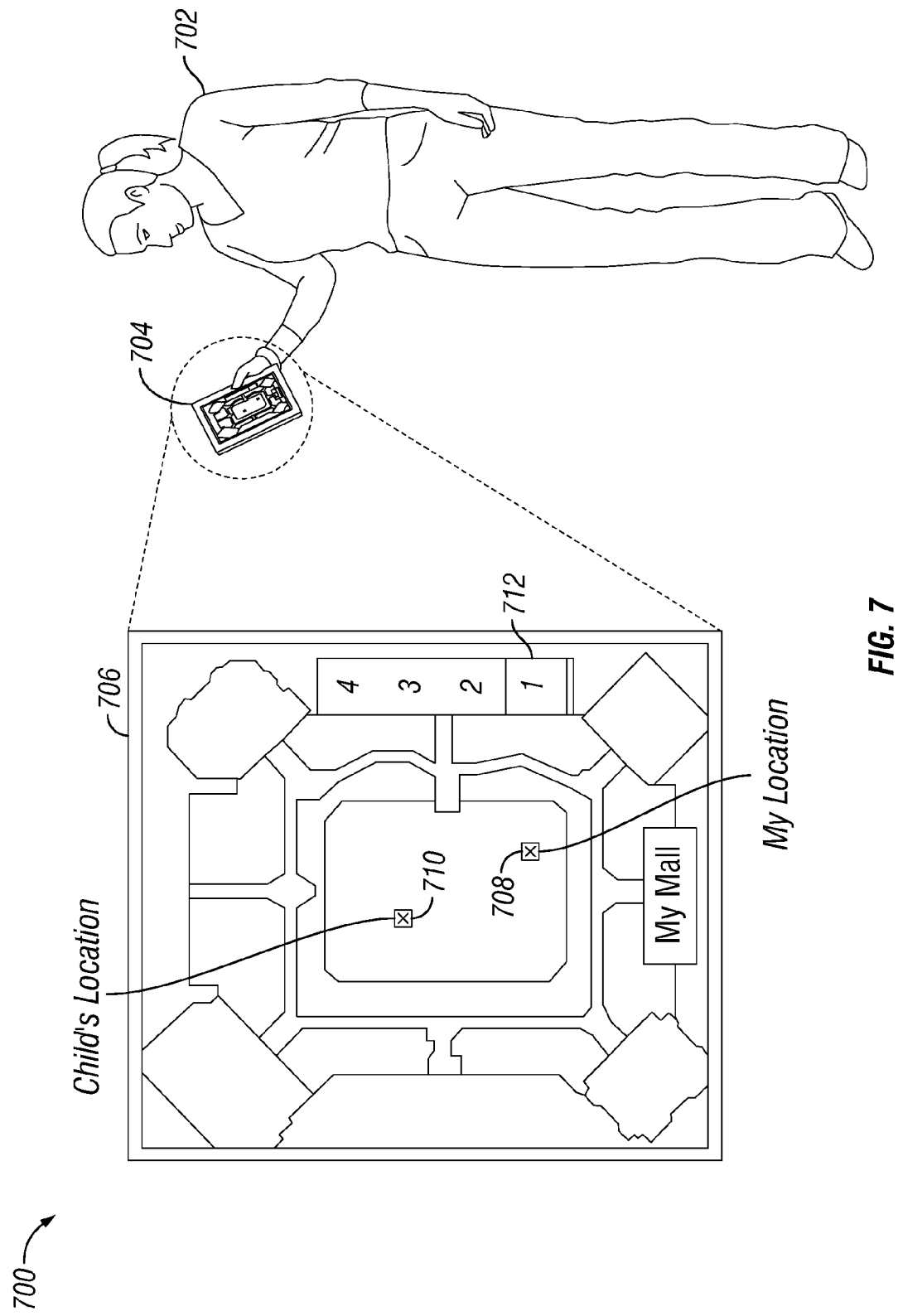
FIG. 7 illustrates a means of displaying a motorized passenger cart's location in relation to a guardian's location in accordance with one embodiment of the present invention.

FIG. 7 depicts a method of displaying 700 a motorized passenger cart's location 710 in relation to a guardian's location 708. The location of a motorized passenger cart may be overlaid over a map 706 of the cart's operating area and displayed to an associated guardian 702 via a smart phone or tablet 704. To help ensure the privacy of the rider's location, communication channels between cart and the monitoring service 300 may be encrypted. As an additional security measure, the guardian 702 will only be shown the location of carts that are associated with the guardian 702. As an administrative feature, the operator may monitor the location of all active carts as well as observe proximity data for riders and guardians associated with each cart. The indoor positioning system may also support multi-level retail spaces where each cart is also tracked per floor as opposed to merely within one plane.

Figure 8:
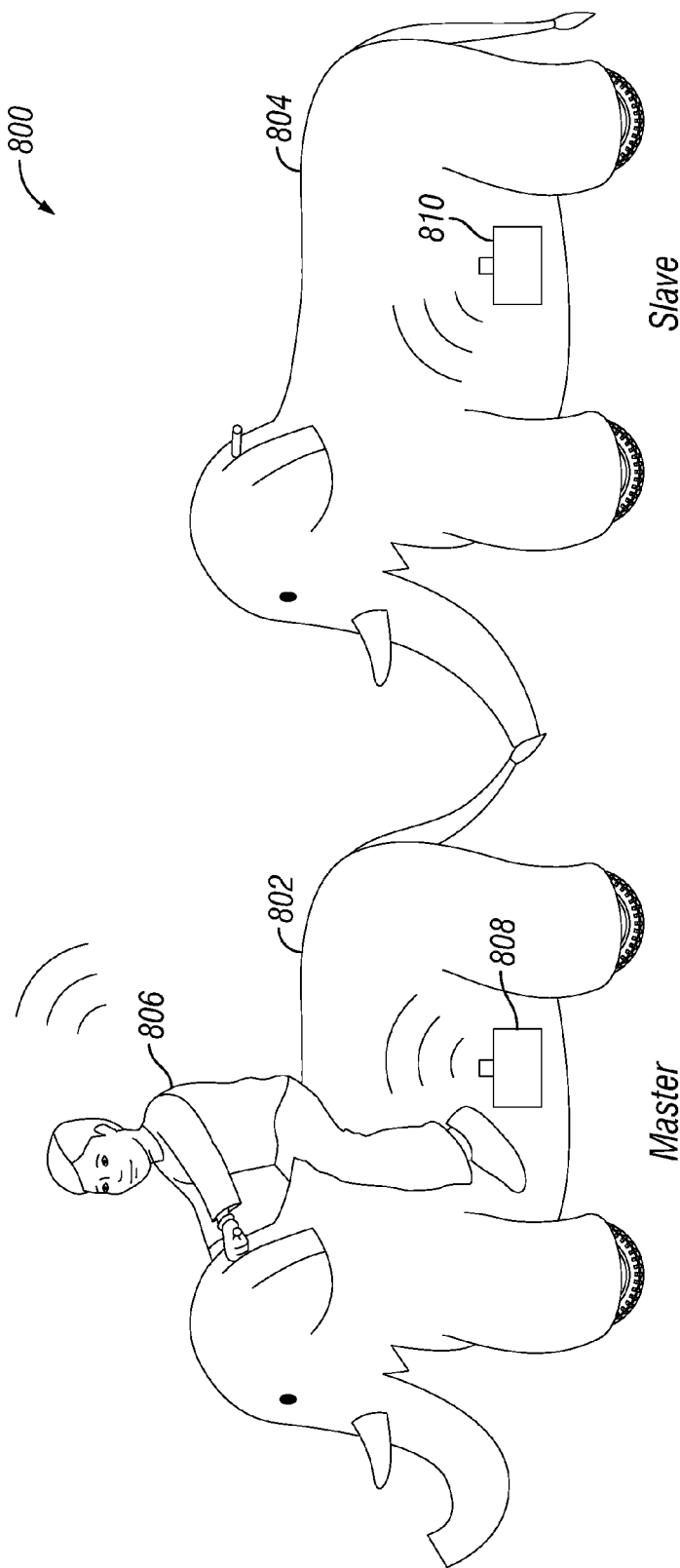
FIG. 8 illustrates a motorized passenger following a lead cart in accordance with one embodiment of the present invention.

FIG. 8 depicts a method of towing 800 at least one motorized passenger cart 804. A master motorized passenger cart 802, also known as the tow, may be used to pull another motorized passenger cart 804, which is placed in "slave" mode. The feature is useful for guardians who want to guide multiple carts and riders. The tow 802 may rely on a simple trailer hitch to couple the slave unit to a master rear-tow assembly. Alternatively, the master unit may activate the slave's auto-follow mode, as described in more detail below. To help aid the auto-follow mode, the master cart may communicate additional navigation instructions over its radio 808 to the slave unit's radio receiver 810. One advantage of using auto-follow mode to couple two carts is that no special tools or physical manipulation is required to connect or disconnect the two carts. It should be appreciated that whatever coupling method is used, more than two carts may be coupled together in an array so as to form a chain of carts.

In some embodiments, the master unit may be hitched to a trailer or non-motorized shopping cart that is used to transport the personal effects or shopping items of the rider or guardian.

Figure 9:
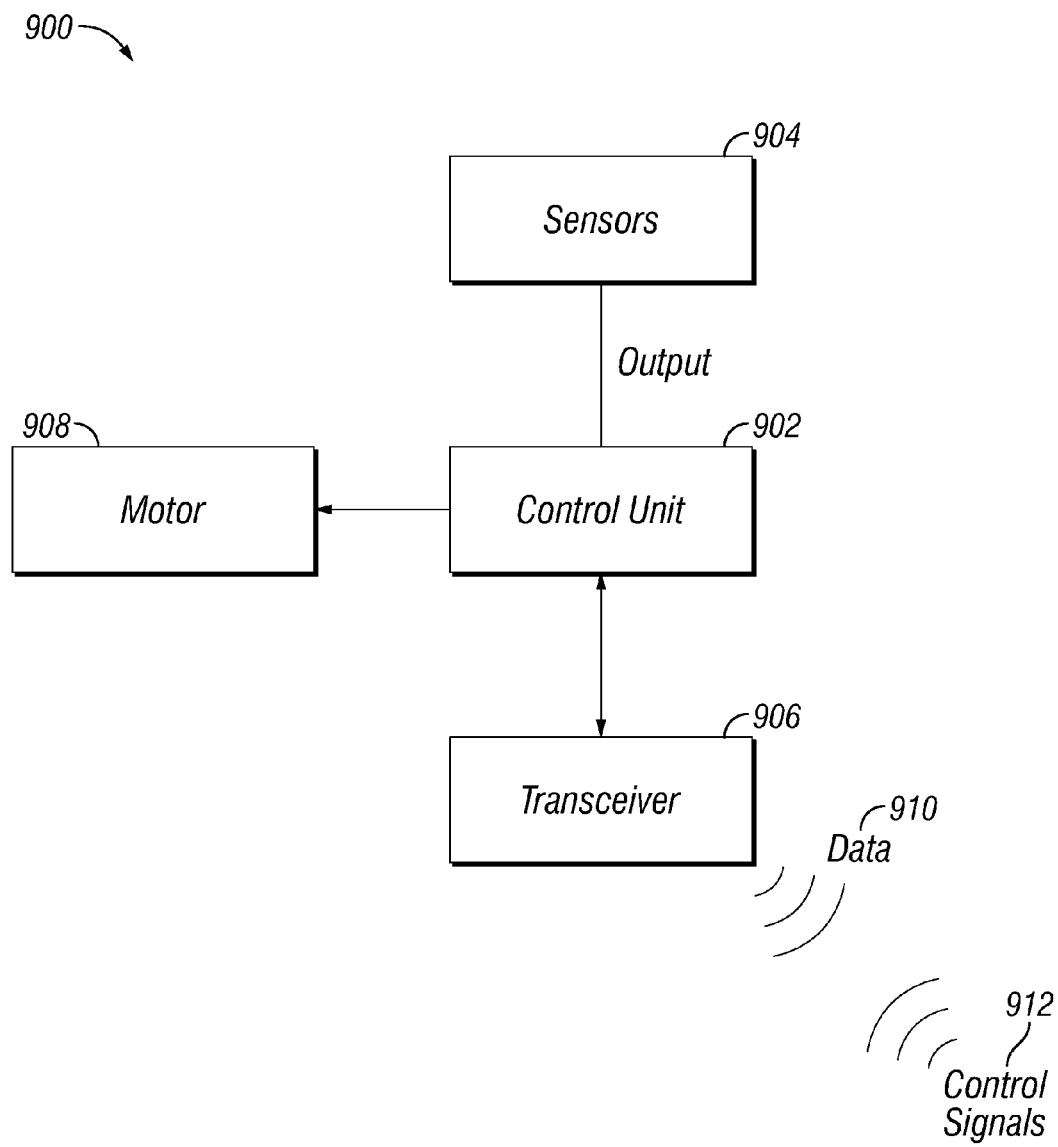
FIG. 9 illustrates a high-level component diagram of a motorized passenger cart control system in accordance with one embodiment of the present invention.

FIG. 9 depicts the high-level system components 900 onboard a motorized passenger cart. The control unit 902 is responsible for coordinating various subsystems within the cart. The control unit 902 is coupled to the sensors 904, the transceiver 906, and the motors 908. The sensors 904 may include any number of proximity detection sensors. A sensor may be any sensing device capable of determining the special orientation or location of the device, such as a laser distance sensor, ultrasonic proximity sensor, camera with video signal processing, photo sensor, motion sensitive antennae or whiskers, or any other similarly suitable device. The sensors 904 communicate sensory data to the control unit 902 where it is processed and interpreted. The motors 908 include a main propulsion motor, which propels the cart, and a servomotor that may be used to automatically steer the cart. The transceiver 906 communicates with a monitoring system, which sends the cart control signals 912, and may communicate with an associated guardian or rider through a smart band.

The system of the present invention can be implemented on a networked computing device platform that is capable of local or remote access by a user. For example, the computing device can be a stored program computer such as a desktop, laptop, server, mainframe, or the like, including but not limited to a RISC or CISC processor, a DSP, a programmable logic device or the like, capable of executing program instructions. Further, it is possible that the system may utilize any one or some combination of the aforementioned devices. Choice of hardware and implementation is considered to be within the skill of one of ordinary skill in the art for which the invention applies.

The process steps of the present invention can be implemented in high or low level programming or scripting languages, such as Basic, C, C++, C#, .NET, Jscript, Java, or the like. Further, some combination of programming utilities may be utilized to achieve the process steps of the invention. Choice of programming language and implementation is considered to be within the skill of one of ordinary skill in the art for which the invention applies. Further, the system may include application programming interface (API) call capabilities to allow a provider or payer to access the novel functionality through use of API calls made within a web browser instance, or may be provided in a proprietary format with a graphical user interface as depicted herein.

Figure 10:
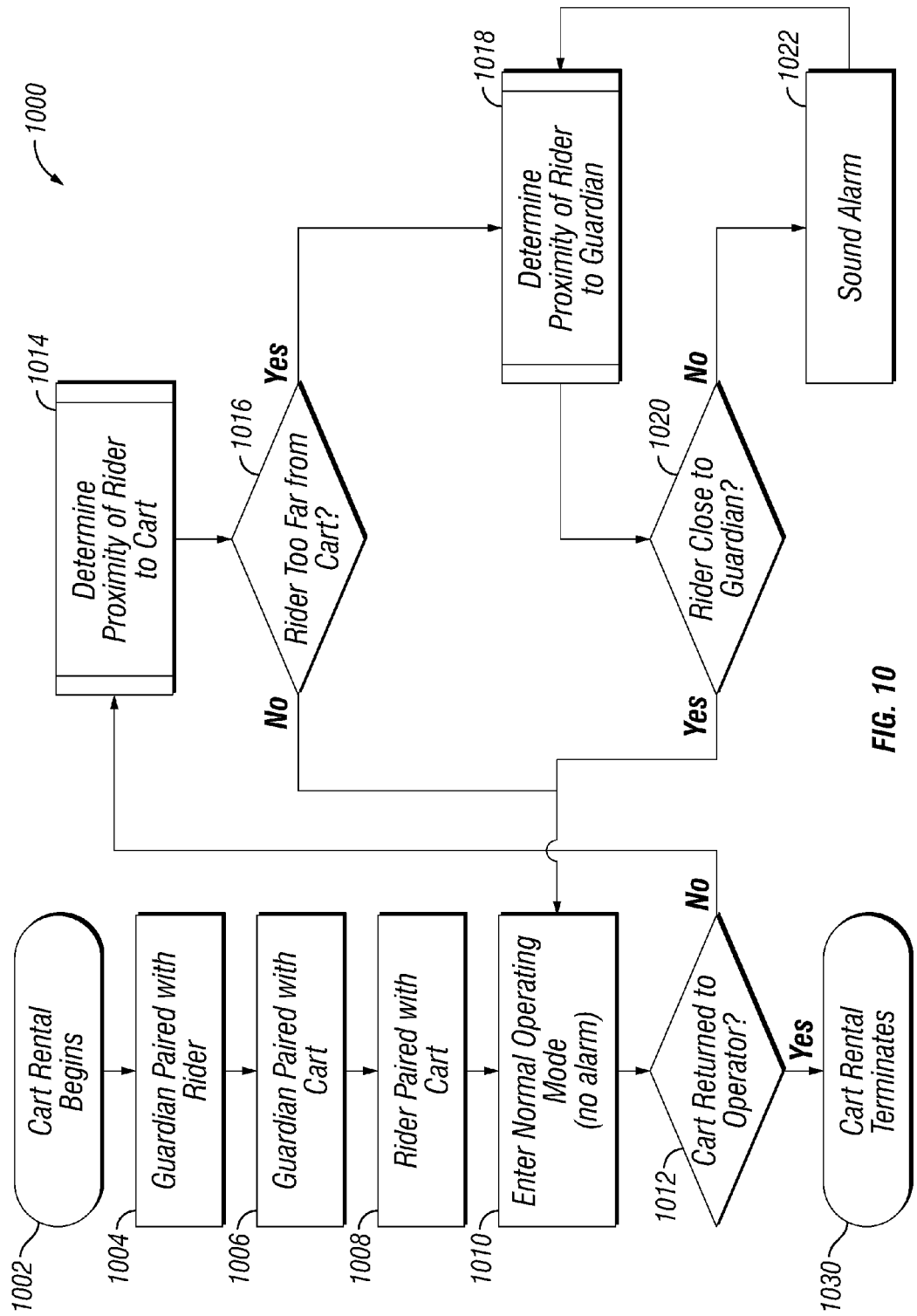
FIG. 10 is a flow chart illustrating a child security system in accordance with one embodiment of the present invention.

FIG. 10 depicts a flow chart illustrating another child security system 1000 in accordance with another embodiment. The purpose of the system is to ensure that the cart and its rider do not become separated unless the rider is with the rider's associated guardian. For example, the cart's security system will trigger if a stranger takes the rider or if the rider wanders off without the cart. However, the system must still allow for authorized departures from the cart, for example, where the guardian and the rider enter a store to shop while leaving the cart outside. The process begins at step 1002 with the rental of a motorized passenger cart. At step 1004, a guardian is associated with a rider. At step 1006, the guardian is associated with the cart. At step 1008, the rider is paired with the cart. At step 1010, the cart begins its normal operation. The cart generally continues its normal operation until another condition occurs or the cart is returned to the operator at step 1012. At step 1014, the cart determines its proximity to the rider. If the rider is within a preconfigured distance, the cart continues normal operation, returning to step 1010. On the other hand, if the cart's rider has exceeded the preconfigured distance, then the cart queries the guardian's monitoring system to determine whether the rider is within a preconfigured distance from the guardian at step 1018. If the monitoring system determines at step 1020 that the rider and guardian are not together, then the cart sounds an alarm at step 1022. Otherwise, the cart continues normal operation at step 1010.

Figure 11:
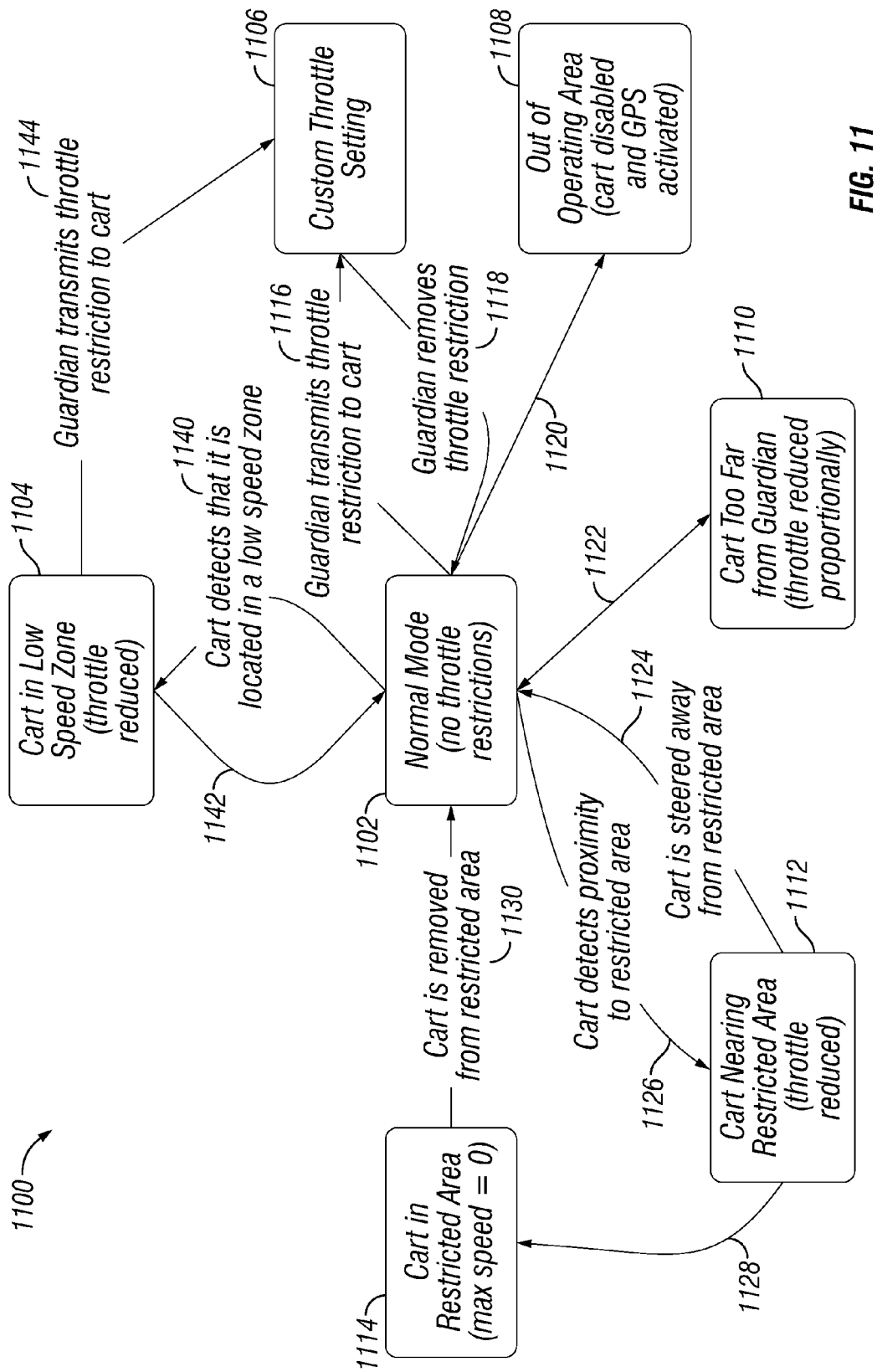
FIG. 11 is a state diagram illustrating how a motorized passenger cart's speed may be limited based on its position within an interior space in accordance with one embodiment of the present invention.

FIG. 11 depicts a state diagram illustrating how a motorized passenger cart's speed may be limited based on its position within an interior space. The motorized passenger cart begins in a normal operating mode in state 1102. In a normal operating mode, the top speed of the cart is not restricted. The cart uses a location-sensing device configured to work with an interior positioning system (IPS), a global positioning system (GPS), or any other suitable system for determining a location within an environment. The cart may use other sensors to augment the accuracy of the main location sensor, such as a laser distance sensor, ultrasonic proximity sensor, camera with video signal processing, or other such sensor useful for determining the distance to another surface or object. The controller onboard the cart may use the position data to determine the cart's logical position within a two-dimensional or three-dimensional model of the operating environment. Or the controller may offload the location processing to a remote service. Regardless of where the data is processed, the logical location of the cart is determined and compared with a preconfigured set of operating zones or boundaries. If the cart has entered a different zone, the cart's state may change accordingly.

If the cart detects that it is located in a low speed zone at event 1140, the cart shifts into state 1104. In state 1104, the cart's maximum speed is reduced to a preconfigured top speed. A low speed zone may correspond to certain high-traffic areas in a retail space or around dangerous areas like an escalator. This could also be used at a zoo or outdoor location where a cart might be allowed higher speeds between exhibits and require lower speeds in a high traffic zone (i.e. food court). While the cart remains in the low speed zone, the rider can alter the speed of the cart (including halting the cart) but cannot accelerate above the preconfigured top speed. The cart leaves the low speed zone state 1104 when the rider steers the cart out of the zone, triggering an event 1142, or if the guardian transmits a custom throttle setting in event 1144. A guardian uses a remote control to set a custom throttle setting for an associated motorized passenger cart. The remote control may be a touch-screen device such as a smart phone or tablet. Or, the guardian's smart band may double as a controller and be configured with a slow-speed switch or a variable throttle. Most systems 1100 will be configured such that the custom throttle setting cannot exceed the maximum speed limit associated with a low speed zone. The cart returns to a normal operating state 1102 when the guardian removes the throttle restrictions in event 1118.

In the event 1122 that the cart strays too far from the associated guardian, the cart will enter an out-of-range state where the maximum speed of the cart is reduced proportional to the cart's distance from the guardian. In other words, the cart is slowed the farther it travels from the guardian. If the guardian closes the distance, the cart's maximum speed is increased until the cart transitions back to its normal operating state 1102. When the cart leaves the operating area in event 1120, the cart will enter out-of-operating-area state 1108, disable itself, and enable GPS tracking if it is not already enabled.

In the event 1126 that the cart detects its proximity to a restricted area, the cart will enter a near-restricted-area state 1112 where its maximum speed will be limited. In the event 1124 that the cart is steered away from the restricted area, the cart will return to its normal operating state 1102. On the other hand, in the event 1128 the cart continues into a restricted area, the cart's maximum speed will be reduced to zero in its restricted state 1114. The cart will remain in a restricted state 1114 until the cart is removed from the restricted area 1130 and transitions to a normal operating state 1102.

Figure 12:
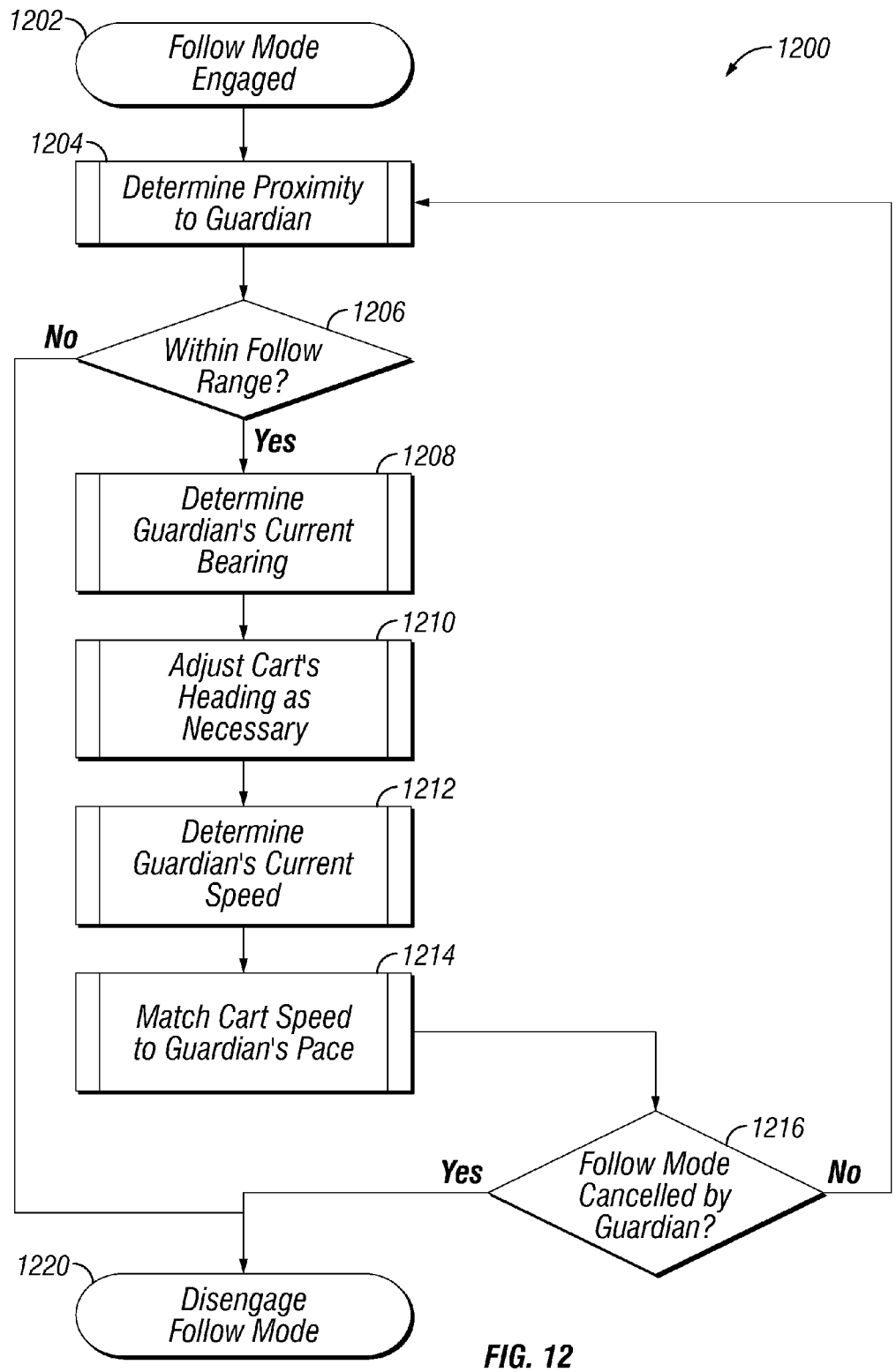
FIG. 12 is a flow chart illustrating a process of automatically piloting a motorized passenger cart in accordance with one embodiment of the present invention.

FIG. 12 depicts a flow chart illustrating a process of automatically piloting a motorized passenger cart. The process begins at step 1202 when a motorized passenger cart's follow-mode is engaged. At step 1204, the cart determines its proximity to an associated guardian. At step 1206, the cart checks to see if it is within a preconfigured follow range. If not, the cart disengages follow-mode at step 1220. Otherwise, the cart continues in follow mode and determines the guardian's current bearing at step 1208. At step 1210, the cart adjusts its heading to match the guardian's determined bearing. At step 1212 the guardian's current speed is determined, and the cart matches its speed to the determined speed of the guardian at step 1214. If the guardian cancels the follow-mode at step 1216, the cart proceeds to disengage follow mode at step 1220. Otherwise, the cart continues to follow the guardian by returning to step 1204.

Figure 13:
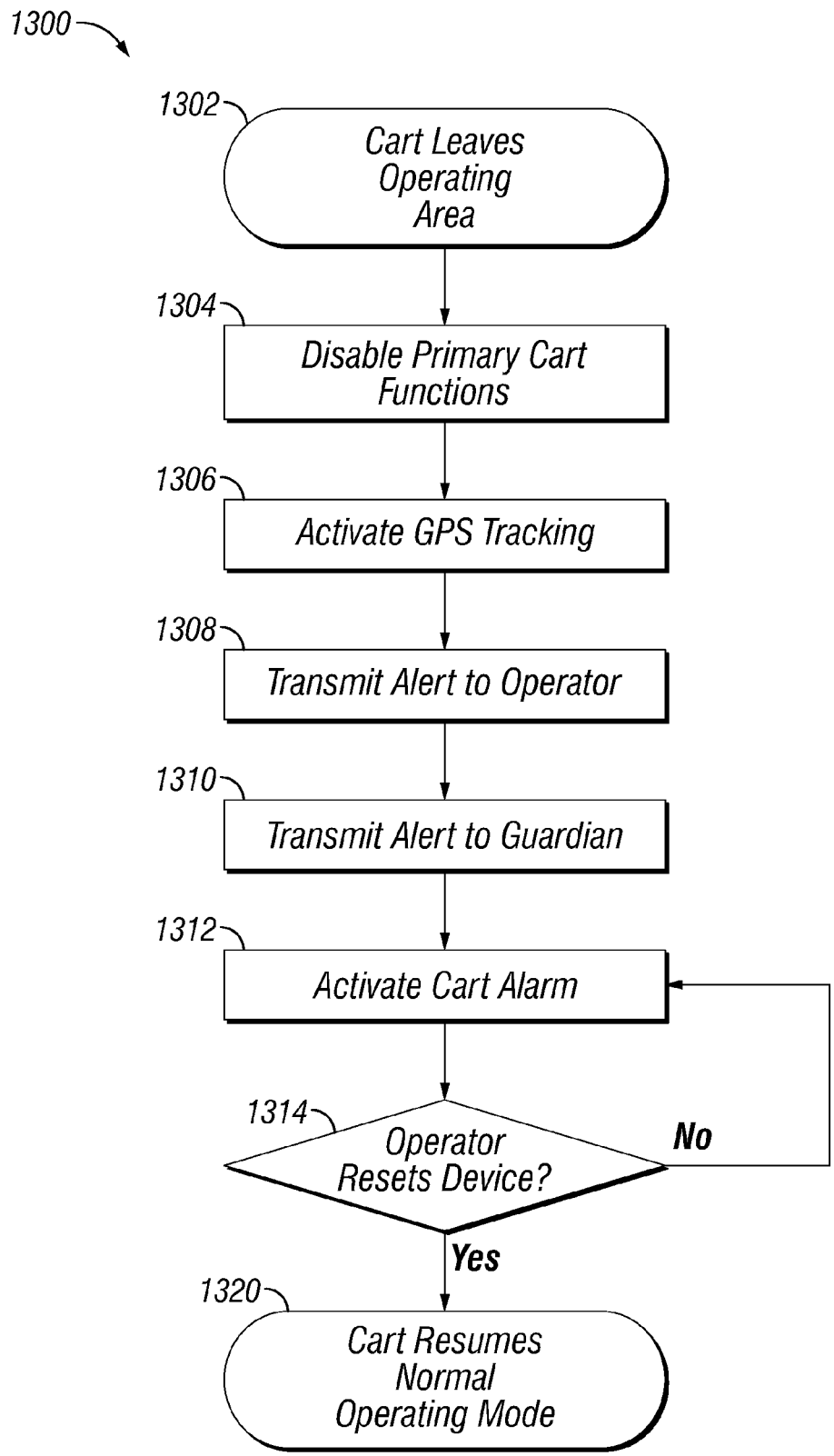
FIG. 13 is a flow chart illustrating an anti-theft and child security feature in accordance with one embodiment of the present invention.

FIG. 13 depicts a flow diagram of a theft deterrent system in accordance with another embodiment. The theft deterrent mechanism 1300 is triggered at step 1302 when the motorized passenger cart leaves the operating area. The operating area may consist of a two- or three-dimensional area of any shape or size that coincides with the physical area that a motorized passenger cart is allowed to operate. The operating area may be defined using coordinates from an indoor positioning system or a global positioning system so that the motorized passenger cart can determine whether its current location is outside the operating area. Once the motorized passenger cart leaves the operating area, the primary cart functions are disabled at step 1304. Primary cart functions may include the motor, steering, and media functionality such as audio or video, but would not include any functions necessary to continue tracking the location of the cart. The cart may disable its primary functions using an asymmetric encryption such that merely resetting the cart's hardware and software systems does not restore the cart to its normal operating state. At step 1306, the car enables a GPS transponder if it is not already active on the cart. The transponder will then continue to relay location information to a tracking server, which may be used to help locate the missing or stolen cart.

The cart will also alert the operator, at step 1308, that the cart has left the operating area. The notification may be actively relayed using a wireless radio or cellular device when the cart leaves the operating area, or the departure may be inferred by the absence of in-operating-area-heartbeat. In other words, if the cart does not verify that it is still in the operating area within a designated window, a monitoring server will notify the operator that the cart has gone missing. The notification may be any form of electronic message such as an entry in a database, an email, a text, an on screen pop-up, or any mechanism suitable for alerting a user. A similar notification may be dispatched to a guardian associated with the cart at step 1310. A notification may be displayed on a computing device such as a smart phone, smart watch, laptop, tablet, or wearable device. At step 1312, an alarm on the cart is activated. The alarm may be any auditory or visual emission that is suitably loud or bright enough to attract the attention of passersby. The alarm and theft deterrent steps 1304 through 1312 persist until a cart operator resets the device at step 1314. To restore primary cart functionality, a method such as a software unlock key must be provided by an authorized cart operator or manufacturer to restore the cart to normal operation. The battery 212 may be encased in a tamper proof enclosure that is designed to trigger the lockdown of the cart before power can be cut. Once the cart operator completes the necessary unlocking protocol, the cart resumes its normal operating mode at step 1320.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

I claim:

1. A conveyance system, comprising:
   a motorized passenger cart operable to be steered by a passenger;
   a controller configured to digitally control the operation of the motorized passenger cart;
   a positioning device, coupled to the controller, operable to determine the location of the motorized passenger cart relative to the layout of a known interior space;
   a speed governor, coupled to the controller, operable to limit the maximum speed of the motorized passenger cart based on a determined location; and
   an interchangeable vehicle skin affixed to the motorized passenger cart.

2. The conveyance system of claim 1, further comprising:
   a speed controller that regulates the motorized passenger cart's speed such that a constant speed may be achieved regardless of passenger weight, friction from the riding surface, or variation in terrain.

3. The conveyance system of claim 1, further comprising:
   a motorized braking mechanism operable to stop the motorized passenger cart when the throttle is released.

4. The conveyance system of claim 1, further comprising: a graphical display.

5. The conveyance system of claim 4, wherein the graphical display shows the current position of the motorized passenger cart on a map.

6. The conveyance system of claim 4, wherein the graphical display shows advertising based on a determined location of the motorized passenger cart.

7. The conveyance system of claim 4, wherein the graphical display shows remaining rental time and an option to purchase more time.

8. The conveyance system of claim 4, wherein the graphical display shows navigation guidance to assist the rider in locating a destination within a retail space.

9. A remote tethering method, comprising the steps:
associating a motorized passenger cart with a guardian;
determining the distance of the motorized passenger cart from the guardian;
limiting the maximum speed of the motorized passenger cart based on the distance;
associating the motorized passenger cart with the passenger;
associating the passenger with the guardian; and
sounding an alarm if the passenger leaves the motorized passenger cart unescorted by the guardian.

10. The remote tethering method of claim 9, further comprising the steps:
defining an operating area;
determining the location of the motorized passenger cart; and
sounding an alarm if the location is outside the operating area.

11. The remote tethering method of claim 9, further comprising the steps:
determining the location of the motorized passenger cart;
determining the distance of the passenger from the motorized passenger cart; and
notifying the guardian of an approximate location of the passenger.

12. A method of remotely towing a motorized passenger cart, comprising the steps:
forming a wireless bond between a motorized passenger cart and a tow;
determining the distance of the motorized passenger cart from the tow;
determining the speed of the tow relative to the motorized passenger cart;
determining the bearing of the tow; and
automatically adjusting the speed and the heading of the motorized passenger cart, based on the speed and the bearing of the tow, so as to keep the distance within a preconfigured range.

13. The method of claim 12, wherein the tow is a guardian.

14. The method of claim 12, wherein the tow is another motorized passenger cart.

* * * * *